United States Patent [19]
Geiman et al.

[11] Patent Number: 5,824,613
[45] Date of Patent: Oct. 20, 1998

[54] LAMINATES COMPRISING TEXTILE STRUCTURES COMPRISING LINEAR LOW DENSITY POLYETHYLENE FIBERS

[75] Inventors: James D. Geiman, Alpharetta; Rakesh K. Gupta, Conyers; Randall E. Kozulla, Social Circle; Richard J. Legare; Robert G. MacLellan, both of Conyers, all of Ga.

[73] Assignee: Hercules Incorporated, Wilmington, Del.

[21] Appl. No.: 642,839

[22] Filed: May 3, 1996

Related U.S. Application Data

[62] Division of Ser. No. 287,973, Aug. 9, 1994.

[51] Int. Cl.$^6$ .................. D03D 3/00; B32B 7/00
[52] U.S. Cl. ............. 442/240; 442/270; 442/272; 442/273; 442/243; 442/388; 442/389
[58] Field of Search ............... 442/270, 272, 442/283, 388, 389, 273, 240, 243

[56] References Cited

U.S. PATENT DOCUMENTS

| | | | |
|---|---|---|---|
| 2,277,049 | 3/1942 | Reed | 154/2 |
| 2,464,301 | 3/1949 | Francis, Jr. | 154/46 |
| 3,649,429 | 3/1972 | Hughes | 442/388 |
| 3,854,177 | 12/1974 | Breen et al. | 28/1.4 |
| 4,076,698 | 2/1978 | Anderson et al. | 526/348.6 |
| 4,199,635 | 4/1980 | Parker | 442/388 |
| 4,477,516 | 10/1984 | Sugihara et al. | 428/296 |
| 4,632,861 | 12/1986 | Vassilatos | 428/296 |
| 4,634,739 | 1/1987 | Vassilatos | 525/240 |
| 4,668,552 | 5/1987 | Scott | 428/92 |
| 4,839,228 | 6/1989 | Jezic et al. | 428/401 |
| 4,938,832 | 7/1990 | Schmalz | 156/308.8 |
| 5,032,333 | 7/1991 | Bankar et al. | 264/103 |
| 5,077,874 | 1/1992 | Trask et al. | 28/115 |
| 5,093,967 | 3/1992 | Frank | 24/693 |
| 5,101,008 | 3/1992 | Cooke et al. | 528/272 |
| 5,133,917 | 7/1992 | Jezic et al. | 264/210.8 |
| 5,199,141 | 4/1993 | Trask et al. | 28/115 |
| 5,294,482 | 3/1994 | Gessner | 428/287 |
| 5,322,728 | 6/1994 | Davey et al. | 428/296 |
| 5,436,064 | 7/1995 | Schnegg et al. | 442/270 |
| 5,456,974 | 10/1995 | Lundblad et al. | 428/229 |
| 5,487,943 | 1/1996 | Kozulla | 428/373 |
| 5,534,340 | 7/1996 | Gupta et al. | 428/286 |
| 5,554,437 | 9/1996 | Kozulla et al. | 428/286 |
| 5,554,441 | 9/1996 | Gupta et al. | 428/373 |
| 5,582,667 | 12/1996 | Gupta et al. | 156/148 |

FOREIGN PATENT DOCUMENTS

| | | |
|---|---|---|
| 154197 | 9/1985 | European Pat. Off. . |
| 324773 | 11/1990 | European Pat. Off. . |
| 2121423 | 12/1983 | United Kingdom . |
| 91-10768 | 7/1991 | WIPO . |
| 94-12699 | 6/1994 | WIPO . |
| 94-25647 | 11/1994 | WIPO . |
| 94-25648 | 11/1994 | WIPO . |

OTHER PUBLICATIONS

WPI/Derwent Abstract of Unitika Ltd. JP–A–05 071 060.

*Primary Examiner*—Patrick Ryan
*Assistant Examiner*—J. M. Gray
*Attorney, Agent, or Firm*—Mark D. Kuller; Joanne W. Patterson

[57] ABSTRACT

A laminate comprising (1) at least one layer of a textile structure comprising linear low density polyethylene fiber and (2) at least one layer of a textile structure comprising nomnelting fiber or fiber having a melting point higher than the linear low density polyethylene fiber, needlepunched and thermally consolidated together.

36 Claims, No Drawings

LAMINATES COMPRISING TEXTILE STRUCTURES COMPRISING LINEAR LOW DENSITY POLYETHYLENE FIBERS

This is a divisional of U.S. patent application Ser. No. 08/287,973, filed Aug. 9, 1994, allowed, (pending) which is incorporated herein by reference in its entirety.

FIELD OF THE INVENTION

This invention relates to polyethylene fibers and to textile structures comprising a higher melting fiber and a lower melting binder fiber.

BACKGROUND OF THE INVENTION

Textile structures are produced from a variety of materials both natural and manmade. Numerous processes are used in the production of these structures, for example, spinning, weaving, knitting, tufting, carding, and needlepunching. The structures thus produced can be dimensionally unstable. Several techniques are used to stabilize these structures, for example, latex treatment or lamination. Some of these treatments require solvents or chemicals with an undesirable environmental impact. Another technique is the blending of nonadhesive fibers with potentially adhesive binder fibers to form a yarn or other textile structure, then activating the potentially adhesive fibers to bond them to the other fibers. The use of binder fibers in stabilizing nonwoven materials is described in U.S. Pat. Nos. 2,277,049 and 2,464,301. Twisted yarns made with binder fibers having a melting point of 110°–170° C. are described in European Patent No. 324,773. Wrap staple yarns containing low melting binder wrap strands based on copolyamides and copolyesters with melting points less than 149° C. are described in U.S. Pat. No. 4,668,552. Binder fibers made from a blend of branched low density polyethylene having a melting point of about 107° C. and crystalline polypropylene are disclosed in U.S. Pat. No. 4,634,739. The use of polyethylene fibers with melting points higher than 110° C., and polypropylene fibers in needled, nonwoven webs is described in U.S. Pat. Nos. 5,077,874 and 5,199,141. Because of the small differential in the melting points of the two fibers, this combination of fibers in the nonwoven structure requires precise control of the heat treatment temperatures to prevent any adverse effect on the primary fibers of the structure, i.e., polypropylene fibers.

It would therefore be desirable to provide a significant differential between the melting point of the primary fibers of a textile structure and the binder fibers, providing a more forgiving process for thermal treatment in the production of dimensionally stable textile structures. This differential can be achieved by providing binder fibers with a sufficiently low melting temperature. However, prior to the instant invention, no one has been able to produce binder fibers comprising linear low density polyethylene fibers having a melting point less than 109° C.

SUMMARY OF THE INVENTION

This invention is directed to fibers comprising at least about 80% by weight linear low density polyethylene (LLDPE) having a melting point of less than 109° C. These fibers can be used in fiber structures of various kinds, which optionally contain fibers other than these LLDPE fibers.

In a preferred embodiment, LLDPE fibers can be used to prepare dimensionally stable, thermally consolidated fiber structures comprising (1) at least about 3% by weight, based on the total weight of the structure, of lower melting fibers comprising at least 80% by weight linear low density polyethylene, and (2) not greater than about 97% by weight, based on the total weight of the structure, of nonmelting fibers, or fibers having a melting point higher than the linear low density polyethylene fibers.

The fiber structures are consolidated by heating to melt the linear low density polyethylene binder fibers without melting the higher melting fibers. The fiber structures of this invention can be in the form of yarns, woven or nonwoven fabrics, carpets, and laminates in which at least one layer comprises a fiber structure of this invention.

The thermally consolidated fiber structures have improved dimensional stability, abrasion resistance, and wear properties. The linear low density polyethylene binder fibers can provide a soft, flexible cloth-like fabric with good drape.

DETAILED DESCRIPTION OF THE INVENTION

The fibers comprising at least about 80% by weight linear low density polyethylene are copolymers of ethylene and up to 20% by weight of a 3–12 carbon alpha-olefin such as, for example, propylene, butene, octene, and hexene. Alpha-olefins having 4–8 carbon atoms are preferred. Mixtures of the alpha-olefin comonomers can also be used, e.g., butene/octene or hexene/octene. The copolymers preferably comprise at least 80% polyethylene. Linear low density polyethylene (LLDPE) is "linear", but with the alkyl groups of alpha-olefin comonomer pendent from the polymer chain, rather than having short chains of polymerized ethylene units pendent from the main polymer chain as is the case with low density polyethylene. The density of LLDPE is typically about 0.88 to 0.94 g/cc. The melting point of the LLDPE fibers can vary depending upon the ratio of the ethylene monomer and the comonomer, and on the polymer structure.

Suitable linear low density polyethylenes include, for example, INSITE™, ENGAGE™, and ASPUN® polyethylenes available from Dow Chemical Company, Midland, Mich., U.S.A., which have melting points of about 90° to 130° C. The preferred fibers have melting points <109° C. Fibers spun from linear low density polyethylenes having melting points <109° C. have not previously been available.

The linear low density polyethylene fibers can be crimped or uncrimped continuous filaments; crimped or uncrimped cut fibers, i.e., staple fibers, with lengths of about 3 to 150 millimeters, preferably about 5–150 mm, and most preferably about 25–50 mm, or discrete microfibers, i.e., melt-blown fibers. The linear low density polyethylene fibers preferably have a denier of about 1–30, more preferably about 2–15, and most preferably about 2–6. In this specification the term "fibers" is meant to include all of the types of fibers and filaments described above. The fibers can contain up to about 20% by weight of other materials such as, for example, stabilizers, pigments, additives and polymers other than linear low density polyethylene. The fibers can have a nominal amount, for example, up to about 2% by weight, of a surface finish, which can be either hydrophilic or hydrophobic. Suitable finishes include, for example, phosphate ester antistatic finishes, ethoxylated fatty acid esters, and polydimethyl siloxanes. Such finishes are described, for example in U.S. Pat. No. 4,938,832 and published European patent applications 486158, 557024, and 516412, the disclosures of which are incorporated by reference.

Linear low density polyethylene (LLDPE) fibers comprising at least about 80% by weight linear low density polyethylene having a melting point less than 109° C. can be used in fiber structures of various kinds, which optionally contain fibers other than the specified linear low density polyethylene fibers.

The fiber structures of this invention include yarns, for example, continuous filament, staple, wrap, or novelty yarns; woven or knitted textile fabrics; tufted textile fabrics such as velvet; loop pile or cut pile carpets; nonwoven fabrics or structures, for example, needlepunched or hydroentangled nonwovens; and laminates comprising several layers of the textile structures of this invention, or laminates comprising at least one layer of a textile structure of this invention and at least one layer of another textile structure.

In a preferred embodiment, LLDPE fibers are used in a thermally consolidated fiber structure comprising (1) at least about 3% by weight, based on the total weight of the structure, of lower melting fibers comprising at least about 80% by weight linear low density polyethylene, and (2) not greater than about 97% by weight, based on the total weight of the structure, of nonmelting fibers or fibers having a melting point higher than the linear low density polyethylene fibers. Typically the structures contain less than 50% by weight LLDPE.

The second, higher melting fibers in the thermally consolidated structures of this invention can be any fiber that melts at least 10° C. higher than the linear low density polyethylene fibers, preferably at least 20° C., and most preferably at least 30° C. higher. These fibers can be crimped or uncrimped continuous filaments; crimped or uncrimped cut fibers, or discrete microfibers. Such fibers include, for example, polypropylene, polyamide, and polyester fibers. Polypropylene fibers are preferred. Nonmelting fibers can also be used. Such fibers include, for example, cotton, wool, acrylic, and rayon fibers. When linear low density polyethylene fibers having a melting point <109° C. are used with polypropylene fibers, the difference between the melting points of the two fibers can be >50° C.

After the linear low density binder fibers and the higher melting fibers are combined, the binder fibers are melted by heating to bond the higher melting fibers to each other. After cooling, the polyethylene solidifies and locks the higher melting fibers in place, producing a dimensionally stable structure.

The linear low density polyethylene multifilament yarns and staple fibers with a melting point of about 107° C. used in the following examples were prepared using ENGAGE™ resin designated 58200.03 available from The Dow Chemical Company, Midland, Mich., U.S.A. The linear low density polyethylene multifilament yarns and staple fibers with a melting point of about 128° C. in the examples were prepared using ASPUN™ resin designated 6835 available from The Dow Chemical Company, Midland, Mich., U.S.A. These resins were melt extruded at temperatures of about 200° to 230° C. and drawn about 2 to 4 times to obtain the final denier per filament. The staple fibers were crimped and cut.

The polyethylene 300 denier/52 filament continuous filament yarns used in the following examples had less than 2% of the surface finish TRYLUBE 7640A, available from Henkel Corporation, Ambler, Pa., U.S.A. The polyethylene staple fibers had less than 2% of the surface finish LUROL PP912, available from George A. Goulston Co., Monroe, N.C., U.S.A.

In this specification, all percentages are by weight unless otherwise noted.

EXAMPLE 1

Polypropylene (PP) bulked continuous multifilament yarns were co-mingled with linear low density polyethylene (LLDPE) continuous multifilament yarns to produce polypropylene/polyethylene composite yarns as shown in Table 1. The composite yarns were then heat-treated at the temperatures indicated in Table 1 for five minutes. Physical characteristics of the heat-treated yarns are also shown in this table. Dimensionally stable yarns with good bonding between the polypropylene filaments were obtained.

TABLE 1

| Sample No. | Polypropylene Yarn (PP) | Polyethylene Yarn (LLDPE) | PE/LLDPE Ratio (%/%) | Heat Treatment Temperature (°C.) | Heat-Treated Composite Yarn Characteristics |
|---|---|---|---|---|---|
| A | 1 End of 500 denier/ 144 filaments M.P. ≈ 162° C. | 1 End of 300 denier/ 52 filaments M.P. ≈ 107° C. | 62/38 | 120° C. | Soft, and good bonding between fibers. |
| B | 2 Ends of 500 denier/ 144 filaments M.P. ≈ 162° C. | 1 End of 300 denier/ 52 filaments M.P. ≈ 107° C. | 77/23 | 120° C. | Soft, and good bonding between fibers. |
| C | 1 End of 500 denier/ 144 filaments M.P. ≈ 162° C. | 1 End of 300 denier/ 52 filaments M.P. ≈ 128° C. | 62/38 | 135° C. | Hard, and good bonding between fibers. |

EXAMPLE 2

Polyester (PET) bulked continuous multifilament yarns were twisted with linear low density polyethylene (LLDPE) continuous multifilament yarns to produce polyester/polyethylene composite yarns as shown in Table 2. These twisted yarns were the n heat-treated at the temperatures indicated in Table 2 for five minutes. Physical characteristics of the heat-treated yarns are also shown in this table. Dimensionally twist-stable yarns with good bonding between the polyester filaments were obtained.

TABLE 2

| Sample No. | Polypropylene Yarn (PET) | Polyethylene Yarn (LLDPE) | PET/LLDPE Ratio (%/%) | Heat Treatment Temperature (°C.) | Heat-Treated Composite Yarn Characteristics |
|---|---|---|---|---|---|
| D | 2 Ends of 400 denier/ 94 filaments M.P. ≈ 260° C. | 1 End of 300 denier/ 52 filaments M.P. ≈ 128° C. | 73/27 | 135° C. | Soft, and good bonding between fibers. |
| E | 4 Ends of 400 denier/ 94 filaments M.P. ≈ 260° C. | 1 End of 300 denier/ 52 filaments M.P. ≈ 128° C. | 84/16 | 135° C. | Soft, and good bonding between fibers. |
| F | 1 End of 400 denier/ 94 filaments M.P. ≈ 260° C. | 1 End of 300 denier/ 52 filaments M.P. ≈ 128° C. | 57/43 | 135° C. | Soft, and good bonding between fibers. |

EXAMPLE 3

Woven fabrics were prepared using different warp and filling yarns as shown in Table 3. LLDPE is linear low density polyethylene. These woven fabrics were then heat-treated at the temperatures indicated in Table 3 for 5 minutes. Physical characteristics of the heat-treated fabrics are also indicated in this table. Dimensionally stable fabrics with good bonding between fibers were obtained. In the table, den.=denier; fil.=filaments.

TABLE 3

| Sample No. | Warp Yarn | Filling Yarn | M.P. of LLDPE (%) | LLDPE (%) | Heat Treatment Temp. (°C.) | Heat-Treated Fabric Characteristics |
|---|---|---|---|---|---|---|
| G | Polyester; 500 denier staple spun yarn M.P. ≈ 260° C. | Alternate Ends of 300 den./52 filaments LLDPE; 400 den./92 fil. polyester | 128 | 21 | 135 | Soft, and good bonding between fibers. |
| H | Polyester; 500 denier staple spun yarn M.P. ≈ 260° C. | Alternate Ends of 300 den./52 filaments LLDPE; 400 den./92 fil. polyester | 107 | 21 | 120 | Soft, and good bonding between fibers. |
| I | Polyester; 500 denier staple spun yarn M.P. ≈ 260° C. | Alternate Ends of 300 den./52 filaments LLDPE; 500 den./144 fil. polypropylene M.P. ≈ 162° C. | 107 | 21 | 120 | Soft, and good bonding between fibers. |

EXAMPLE 4

A nonwoven web with a basis weight of 62 g/yd² was prepared using a 50%/50% by weight blend of linear low density polyethylene 3 denier/filament staple fibers with a melting point of about 107° C. and polypropylene 2.2 denier/filament staple fibers with a melting point of about 162° C. This nonwoven web was needlepunched to a 95 g/yd² woven polyester fabric with a melting point of about 260° C. Two samples of this fabric structure were each heat-treated for five minutes at 118° C. and then at 123° C. These heat-treated fabric structures exhibited good dimensional stability and soft hand.

EXAMPLE 5

A nonwoven web having a basis weight of 53 g/yd² was prepared using a 25%/75% by weight blend of linear low density polyethylene 3 denier/filament staple fibers with a melting point of about 107° C. and polypropylene 2.2 denier/filament staple fibers with a melting point of about 162° C. Laminates comprising two, four, and six layers of this nonwoven web were prepared and were each heat-treated at 120° C. for 5 minutes. These heat-treated nonwoven structures exhibited good dimensional stability and soft hand.

EXAMPLE 6

A nonwoven web having a basis weight of 62 g/yd² was prepared using a 50%/50% by weight blend of linear low density polyethylene 3 denier/filament staple fibers with a melting point of about 107° C., and polypropylene 2.2 denier/filament staple fibers with a melting point of about 162° C. This nonwoven web was combined with a plain weave woven polyester fabric having a basis weight of 95 g/yd², and the two structures were needlepunched together. This composite textile structure was then heat-treated at 120° C. for 5 minutes to substantially melt the linear low density polyethylene fibers. The resultant textile structure exhibited good dimensional stability and soft hand.

EXAMPLE 7

A nonwoven web having a basis weight of 27 g/yd² was prepared using linear low density polyethylene 5 denier/filament staple fibers with a melting point of about 107° C. This nonwoven web was combined with a plain weave woven polyester fabric having a basis weight of 95 g/yd², and the two structures were needlepunched together. This composite textile structure was then heat-treated at 120° C. for 5 minutes to substantially melt the linear low density polyethylene fibers. The resultant textile structure exhibited good dimensional stability and soft hand.

EXAMPLE 8

A nonwoven web having a basis weight of 48 g/yd$^2$ was prepared using linear low density polyethylene 5 denier/filament staple fibers with a melting point of about 107° C. This nonwoven web was combined with a plain weave woven polyester fabric having a basis weight of 95 g/yd$^2$, and the two structures were needlepunched together. This composite textile structure was then heat-treated at 120° C. for 5 minutes to substantially melt the linear low density polyethylene fibers. The resultant textile structure exhibited good dimensional stability and soft hand.

It is not intended that the examples given here should be construed to limit the invention, but rather they are submitted to illustrate some of the specific embodiments of the invention. Various modifications and variations of the present invention can be made without departing from the scope of the appended claims.

We claim:

1. A laminate consisting essentially of (1) at least one layer of a textile structure comprising linear low density polyethylene staple fiber and (2) at least one layer of a textile structure comprising nonmelting fiber or fiber having a melting point higher than the linear low density polyethylene fiber, needlepunched and thermally consolidated together.

2. The laminate of claim 1 wherein the linear low density polyethylene is a copolymer of ethylene and at least one 3 to 12 carbon alpha-olefin.

3. The laminate of claim 2 wherein the alpha-olefin is selected from the group consisting of propylene, butene, octene, hexene, and mixtures thereof.

4. The laminate of claim 2 wherein the linear low density polyethylene has a density of about 0.88 to about 0.94 g/cc.

5. The laminate of claim 1 wherein the linear low density polyethylene has a melting point less than 109° C.

6. The laminate of claim 1 wherein the linear low density polyethylene is a copolymer of ethylene and at least one 3 to 12 carbon alpha-olefin comprising at least 80% ethylene, and has a melting point less than 109° C., and has a density of about 0.88 to about 0.94 g/cc.

7. The laminate of claim 1 wherein the nonmelting fiber and the fiber having a melting point higher than the linear low density polyethylene are selected from the group consisting of propylene, polyester, rayon, cotton, acrylic, and wool fibers.

8. The laminate of claim 7 wherein the melting point of the linear low density polyethylene is less than 109° C.

9. The laminate of claim 1 wherein the at least one layer of a textile structure comprising nonmelting fiber or fiber having a melting point higher than the linear low density polyethylene fiber comprises a layer comprising the fiber having a melting point higher than the linear low density polyethylene fiber.

10. The laminate of claim 9 wherein the fiber having a melting point higher than the linear low density polyethylene has a melting point at least 10° C. higher than the melting point of the linear low density polyethylene.

11. The laminate of claim 10 wherein the difference in melting points is at least 20° C.

12. The laminate of claim 10 wherein the difference in melting points is at least 30° C.

13. The laminate of claim 12 wherein the melting point of the linear low density polyethylene is less than 109° C.

14. The laminate of claim 10 wherein the difference in melting points is at least 50° C.

15. The laminate of claim 9 wherein the fiber having a melting point higher than the linear low density polyethylene is polypropylene fiber.

16. The laminate of claim 15 wherein the melting point of the linear low density polyethylene is less than 109° C.

17. The laminate of claim 9 wherein the fiber having a melting point higher than the linear low density polyethylene is polyester fiber.

18. The laminate of claim 17 wherein the melting point of the linear low density polyethylene is less than 109° C.

19. The laminate of claim 9 wherein the melting point of the linear low density polyethylene is less than 109° C.

20. The laminate of claim 1 wherein the textile structure comprising linear low density polyethylene fiber is a nonwoven fabric comprising linear low density polyethylene staple fiber and the layer of a textile structure comprising nonmelting fiber or fiber having a melting point higher than the linear low density polyethylene fiber is a woven fabric.

21. The laminate of claim 20 wherein the woven fabric comprises a polyester woven fabric.

22. The laminate of claim 21 wherein the melting point of the linear low density polyethylene is less than 109° C.

23. The laminate of claim 20 wherein the nonwoven fabric consists essentially of the linear low density polyethylene staple fiber.

24. The laminate of claim 23 wherein the melting point of the linear low density polyethylene is less than 109° C.

25. The laminate of claim 20 wherein the nonwoven fabric comprises the linear low density polyethylene staple fiber and polypropylene staple fiber.

26. The laminate of claim 23 wherein the melting point of the linear low density polyethylene is less than 109° C.

27. The laminate of claim 20 wherein the melting point of the linear low density polyethylene is less than 109° C.

28. The laminate of claim 1 wherein the at least one layer of a textile structure comprising nonmelting fiber or fiber having a melting point higher than the linear low density polyethylene fiber comprises a layer comprising the nonmelting fiber.

29. The laminate of claim 28 wherein the nonmelting fiber is selected from the group consisting of cotton and wool fibers.

30. A laminate consisting essentially of (1) at least one layer of a textile structure comprising linear low density polyethylene staple fiber and (2) at least one layer of a textile structure comprising nonmelting fiber or fiber having a melting point higher than the linear low density polyethylene fiber, needlepunched and thermally consolidated together; which is soft and flexible.

31. The laminate of claim 30 wherein the layer of a textile structure comprising nonmelting fiber or fiber having a melting point higher than the linear low density polyethylene fiber is a woven fabric.

32. The laminate of claim 30 wherein the layer of a textile structure comprising nonmelting fiber or fiber having a melting point higher than the linear low density polyethylene fiber is a polyester woven fabric.

33. The laminate of claim 32 wherein the linear low density polyethylene is a copolymer of ethylene and at least one 3 to 12 carbon alpha-olefin having a density of about 0.88 to about 0.94 g/cc and has a melting point less than 109° C.

34. The laminate of claim 32 wherein the layer of a textile structure comprising linear low density polyethylene staple fiber consists essentially of the linear low density polyethylene staple fiber and polypropylene staple fiber.

35. The laminate of claim 34 which contain one of each of the layers.

36. A laminate consisting essentially of (1) at least one layer of a textile structure comprising linear low density polyethylene staple fiber and (2) at least one layer of a textile structure comprising nonmelting fiber or fiber having a melting point higher than the linear low density polyethylene fiber, needlepunched and thermally consolidated together; which is soft, flexible and cloth-like.

* * * * *